US008994885B2

(12) United States Patent
Ando et al.

(10) Patent No.: US 8,994,885 B2
(45) Date of Patent: Mar. 31, 2015

(54) PRE-EDGING LENS AND METHOD FOR MANUFACTURING EDGED LENS

(75) Inventors: Tomohiro Ando, Higashimurayama (JP); Kenji Matsumoto, Tokyo (JP); Ayano Tanabe, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 285 days.

(21) Appl. No.: 13/641,853

(22) PCT Filed: Apr. 18, 2011

(86) PCT No.: PCT/JP2011/059992
§ 371 (c)(1),
(2), (4) Date: Dec. 28, 2012

(87) PCT Pub. No.: WO2011/132789
PCT Pub. Date: Oct. 27, 2011

(65) Prior Publication Data
US 2013/0107186 A1  May 2, 2013

(30) Foreign Application Priority Data

Apr. 19, 2010 (JP) .................................. 2010-096274
Sep. 22, 2010 (JP) .................................. 2010-211969

(51) Int. Cl.
*G02F 1/1335* (2006.01)
*G02C 7/08* (2006.01)
(Continued)

(52) U.S. Cl.
CPC .......... *G02F 1/133526* (2013.01); *G02C 7/083* (2013.01); *G02C 7/101* (2013.01); *G02F 1/1339* (2013.01); *G02F 2203/28* (2013.01); *G02F 1/29* (2013.01); *G02F 2001/294* (2013.01)
USPC ........................................ 349/13; 351/159.39

(58) Field of Classification Search
CPC .................... G02F 1/133351; G02F 1/133325; G02C 7/083; B29D 11/00817
USPC ........ 349/13, 153, 155, 158, 187; 351/159.39
See application file for complete search history.

(56) References Cited

U.S. PATENT DOCUMENTS 8,523,354 B2 * 9/2013 Haddock et al. .......... 351/159.42
2009/0256977 A1 * 10/2009 Haddock et al. ................ 349/13
2014/0036337 A1 * 2/2014 Neuman et al. ............... 359/265

FOREIGN PATENT DOCUMENTS

JP        59-116717        7/1984
JP        03-035523        2/1991
(Continued)

OTHER PUBLICATIONS

English-language International Search Report from the Japanese Patent Office, mailed Jun. 7, 2011, for International Application No. PCT/JP2011/059992.
(Continued)

*Primary Examiner* — Nathanael R Briggs
(74) *Attorney, Agent, or Firm* — Finnegan, Henderson, Farabow, Garrett & Dunner, L.L.P.

(57) ABSTRACT

An object of the present invention is to provide a pre-edging lens and a method for manufacturing an edged lens, wherein provisions are made to be able to maintain the cell gap of a liquid crystal lens structure constant while, in effect, eliminating the need to incorporate any spacers in the edged lens. More specifically, the invention provides a pre-edging lens and a method for manufacturing an edged lens, wherein the pre-edging lens includes a first transparent substrate, a second transparent substrate, a first sealing material which does not contain any spacer, a liquid crystal layer provided between the first transparent substrate and the second transparent substrate and sealed by the first seal, and a second seal which contains a spacer and which is disposed in a region provided between the first transparent substrate and the second transparent substrate and located outwardly of the first seal, the region being removed during edging.

6 Claims, 13 Drawing Sheets

(51) Int. Cl.
*G02C 7/10* (2006.01)
*G02F 1/29* (2006.01)
*G02F 1/1339* (2006.01)

(56) References Cited

FOREIGN PATENT DOCUMENTS

| | | |
|---|---|---|
| JP | 6-160871 | 6/1994 |
| JP | 11-24085 | 1/1999 |
| JP | 2008-241888 | 10/2008 |
| JP | 2009-69487 | 4/2009 |
| JP | 2009-80280 | 4/2009 |
| JP | 2010-54524 | 3/2010 |

OTHER PUBLICATIONS

European Search Report issued in EP Application No. 11772120.9 dated Dec. 18, 2013.

\* cited by examiner

PRE-EDGING LENS AND METHOD FOR MANUFACTURING EDGED LENS

TECHNICAL FIELD

The present invention relates to a pre-edging lens and a method for manufacturing an edged lens.

BACKGROUND

Providing eyeglasses in which lenses capable oil changing color in response to an applied voltage which are mounted in an eyeglass frame and connected to a power supply separately provided within the eyeglass frame is known (refer, for example, to patent document 1).

Further, in order to prevent color interference from appearing due to an uneven cell gap in a large liquid crystal cell, provide a liquid crystal cell in which a plurality of sealing walls are formed using sealing material with spacer members mixed therein is known (refer, for example, to patent document 2).

On the other hand, research and development has been proceeding to develop a liquid crystal apparatus that use flexible substrates formed, for example, from plastic, etc. Such a liquid crystal apparatus is constructed using a liquid crystal panel in which a spacer and a sealing material are provided between a pair of substrates in order to ensure that the two substrates are spaced a certain distance apart from each other.

In the case of a liquid crystal panel that uses flexible substrates, the sealing material tends to delaminate easily from the substrates because the substrates are readily bendable. To address this, there is proposed a method that increases the bonding strength of the two substrates by applying an adhesive on the outside of the sealing material. However, one the panel has been fabricated with the two substrates bonded together using a sealing material, it is difficult to apply an adhesive so as to penetrate into a restricted space created between the substrates on the outside of the sealing material. Various proposals have been made to address such fabrication difficulty (refer, for example, to patent document 3).

According to the proposal disclosed in patent document 3, there is provided a method that includes manufacturing a liquid crystal cell with a pair of substrates 1 and 2 bonded together by a sealing material 3, and enlarging the spacing between the pair of substrates 1 and 2 at a position located outwardly of the sealing material 3, applying an adhesive 6 to the position where the spacing between the pair of substrates 1 and 2 has been enlarged, and curing the adhesive 6.

Patent document 1: Japanese Utility Patent Publication No. H03-35523 (FIGS. 1 and 3)
Patent document 2: Japanese Unexamined Patent Publication No. S59-116717 (FIG. 1)
Patent document 3: Japanese Unexamined Patent Publication No. 2008-241888 (Pages 5 and 6, FIGS. 1 to 3)

SUMMARY

FIG. 14 is a cross-sectional view showing one example of a blank lens 1.

The blank lens 1 includes a first transparent substrate 2, a second transparent substrate 3, and a liquid crystal lens structure 7, and the liquid crystal lens structure 7 includes a liquid crystal layer 8 sandwiched between the first and second transparent substrates 2 and 3 and sealed by a sealing material 4 containing a spacer 5. Solid line 6 shows one example of a cross-sectional shape of an edged lens generated by edging to fit an eyeglass frame.

Since the blank lens 1 is later edged to fit the eyeglass frame, it is preferable to form the liquid crystal lens structure 7 as compact as possible in order to ensure edge freedom. However, if the liquid crystal lens structure 7 is formed compact, since the sealing material 4 containing the spacer 5 remains in the edged lens, there arises the problem that the presence of the spacer member 5 or reflections or scattering caused by scratches left on the substrates interfere with the viewing field of a wearer of the edged lens which results in an uncomfortable feeling when viewing an object through the edged lens.

On the other hand, the prior art method disclosed in patent document 3 has had the problem that the method cannot be applied to substrates that do not have high flexibility, because the step of enlarging the spacing between the pair of substrates involves bending at least one of the substrates by applying a force to the one substrate.

Accordingly, it is an object of the present invention to provide a pre-edging lens and a method for manufacturing an edged lens that aim to solve the above problems.

It is also an object of the present invention to provide a pre-edging lens and a method for manufacturing an edged lens, wherein provisions are made to be able to maintain the cell gap of a liquid crystal lens structure constant while, in effect, eliminating the need to incorporate any spacers in the edged lens.

It is a further object of the present invention to provide a pre-edging lens and a method for manufacturing an edged lens, wherein provisions are made to be able to fill a resin into a space created between the substrates outside a seal which seals a liquid crystal, even when the substrates used do not have high flexibility.

Pre-edging lens according to the invention includes a first transparent substrate, a second transparent substrate, a first sealing material which does not contain any spacer member, a liquid crystal layer provided between the first transparent substrate and the second transparent substrate and sealed by the first sealing material, and a second sealing material which contains a spacer member and which is disposed in a region provided between the first transparent substrate and the second transparent substrate and located outwardly of the first sealing material, the region being removed during edging.

An edged lens manufacturing method according to the invention includes disposing, between a first transparent substrate and a second transparent substrate, a first sealing material which does not contain any spacer member and a second sealing material which contains a spacer member, the second sealing material being located outwardly of the first sealing material, and thereby forming a blank lens having a liquid crystal layer provided between the first transparent substrate and the second transparent substrate and sealed by the first sealing material, forming a finished lens by processing the blank lens, and forming an edged lens by removing portions containing the second sealing material.

According to the pre-edging lens and the edged lens manufacturing method, a plurality of sealing materials are formed in the pre-edging lens, but since provisions are made so that any spacer member does not, in effect, remain in the edged lens, the transparency of the lens increases and scratches due to strain are not left on the substrates; it thus becomes possible to solve the problem that the presence of the spacer member interferes with the viewing field of the lens wearer and makes the lens wearer feel uncomfortable.

Further, according to the pre-edging lens and the edged lens manufacturing method, since the sealing material containing the spacer member and the sealing material not containing the spacer member are formed separately in different regions, it is possible to construct the lens so that any spacer member does not, in effect, remain in the edged lens, while maintaining the cell gap of the liquid crystal lens structure constant and without having to make any particular modifications to existing manufacturing equipment.

Furthermore, according to the pre-edging lens and the edged lens manufacturing method, the beveled edge of the lens may be colored, in that case, it becomes possible not only to construct the lens so that any spacer member does not, in effect, remain in the edged lens, while maintaining the cell gap of the liquid crystal lens structure constant, but also enhance the aesthetic visual effect of the design.

A liquid crystal optical element according to the invention includes a first substrate, a second substrate, a sealing material disposed between the first substrate and the second substrate, and a liquid crystal layer formed in an interior space defined by the sealing material between the first substrate and the second substrate, wherein the first substrate and the second substrate are separated from each other by a gap that is larger at substrate edges than at a position where the sealing material is disposed.

In a method for manufacturing the liquid crystal optical element, it is preferable that, in a substrate preparation step, one of the first and second substrates has a curvature greater than that of the other.

Preferably, the method for manufacturing the liquid crystal optical element includes, separately from the sealing material forming step, an outside sealing material forming step in which an outside sealing material containing an outside spacer lager than the inside spacer is formed in a region located outwardly of the sealing material.

Preferably, the method for manufacturing the liquid crystal optical element further includes an outer shape cutting step in which the first and second transparent substrates with a resin filling layer sandwiched therebetween are cut along a line radially outward of the sealing material.

According to the liquid crystal optical element and the method for manufacturing the liquid crystal optical element, since the gap between the first substrate and the second substrate is made larger at the substrate edges than at the sealing material, the gap between the first substrate and the second substrate is smaller at the sealing material than at the substrate edges, as a result, when injecting an adhesive material into the substrate gap outside the sealing material, the capillary action is promoted, facilitating the injection of the material.

DESCRIPTION OF EMBODIMENTS

A pre-edging lens and a method for fabricating an edged lens will be described below with reference to the drawings. It will, however, be noted that the technical scope of the present invention is not limited to the specific embodiments described herein but extends to the inventions described in the appended claims and their equivalents.

In the following description, a blank lens and a finished lens (or a semi-finished lens) will each be referred to as a pre-edging lens, while a lens generated by edging such a pre-edging lens will be referred to as an edged lens. Further, a blank lens and a finished lens (or a semi-finished lens), if such lenses contain a liquid crystal lens structure, will be collectively referred to as "liquid crystal lenses".

Figure 1:
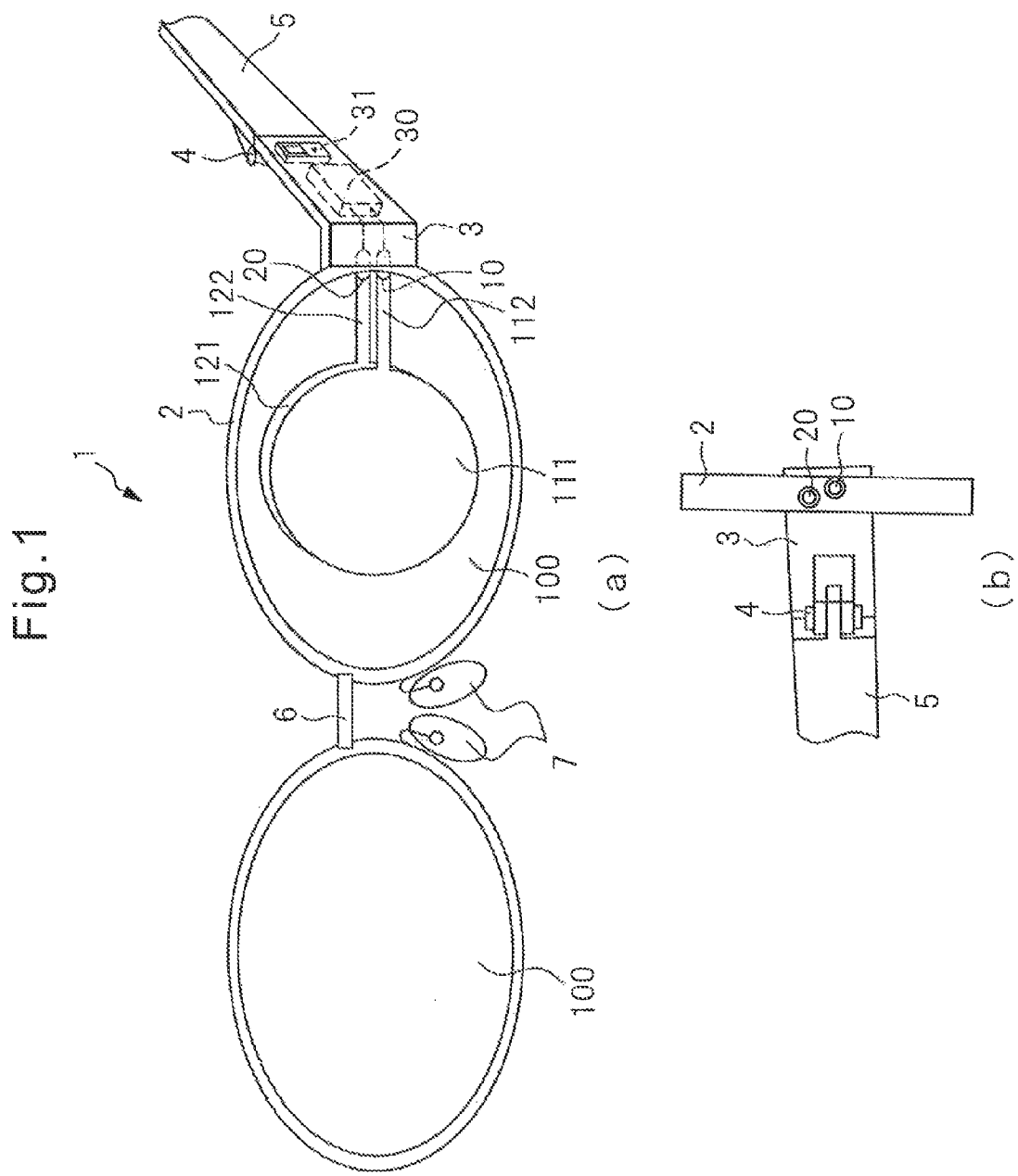
FIG. 1 is a schematic diagram showing a portion of electronic eyeglasses 1.

FIG. 1 is a schematic diagram showing a portion of electronic eyeglasses 1 as an example of the use of edged lenses.

As shown in FIG. 1(a), the electronic eyeglasses 1 include an eyeglass frame 2, end pieces 3, hinges 4, temples 5, a bridge 6, and nose pads 7, and a pair of edged lenses 100 is mounted into the eyeglass frame 2. The end piece 3 contains spring connectors 10 and 20 for electrically connecting to the liquid crystal lens structure 50 contained in the edged lens 100, a voltage supply 30 including a battery as a power supply connected to the spring connectors 10 and 20, a DIP switch 31, etc.

FIG. 1 (b) is a diagram showing the spring connectors 10 and 20 as viewed from the inside of the eyeglass frame 2. As shown in FIG. 1(b), the spring connectors 10 and 20 are provided in such a manner as to be insertable into first and second recessed portions 113 and 123 formed in the edged lens 100 as will be described later. The inside of the eyeglass frame 2 may be provided with a groove into which the beveled edge of the edged lens 100 is fitted. The "beveled edge" is the raised portion formed around the periphery of the lens so as to fit into the inside groove of the eyeglass frame 2 when attaching the lens to the eyeglass frame 2, and usually has a height of about 0.5 to 1 mm.

The liquid crystal lens structure 50, which includes a first transparent electrode 111 deposited over a Fresnel lens surface and a second transparent electrode 121 disposed opposite the first transparent electrode 111, is formed in the center of the edged lens 100, as will be described later. When no voltage is applied between the first transparent electrode 111 and the second transparent electrode 121, the liquid crystal lens structure 50 remains inoperative, and the electronic eyeglasses 1 can thus provide the lens power that the edged lens 100 originally has. When a prescribed voltage from the voltage supply 30 is applied between the first transparent electrode 111 and the second transparent electrode 121, the liquid crystal lens structure 50 operates as a lens having prescribed power; as a result, in the portion of the edged lens 100 where the liquid crystal lens structure 50 is formed, the liquid crystal lens structure 50 operates so as to change the focal length of that portion of the edged lens 100.

For example, the edged lens 100 itself may be designed to have a lens form that provides power to focus on a distant object, with provisions made so that when the liquid crystal lens structure 50 is inoperative, the electronic eyeglasses are used as glasses for distance viewing, while when the liquid crystal lens structure 50 is activated, the electronic eyeglasses are used as glasses for near viewing. If provisions are made to be able to turn on and off the voltage application to the liquid crystal lens structure 50 by the DIP switch 31 provided on the electronic glasses 1, the electronic glasses 1 can be operated as bifocals whose focal length can be switched as desired by the DIP switch 31. The type of eyeglasses that can be achieved with the edged lenses is not limited to the above example, but the edged lenses can be applied to various kinds of eyeglasses, examples including electronic eyeglasses for farsightedness, whose near viewing power can be changed in multiple steps, electronic eyeglasses for nearsightedness, whose distance viewing power can be changed in multiple steps, glasses for correcting an astigmatism or reading glasses, and glasses for vision training.

Figure 2:
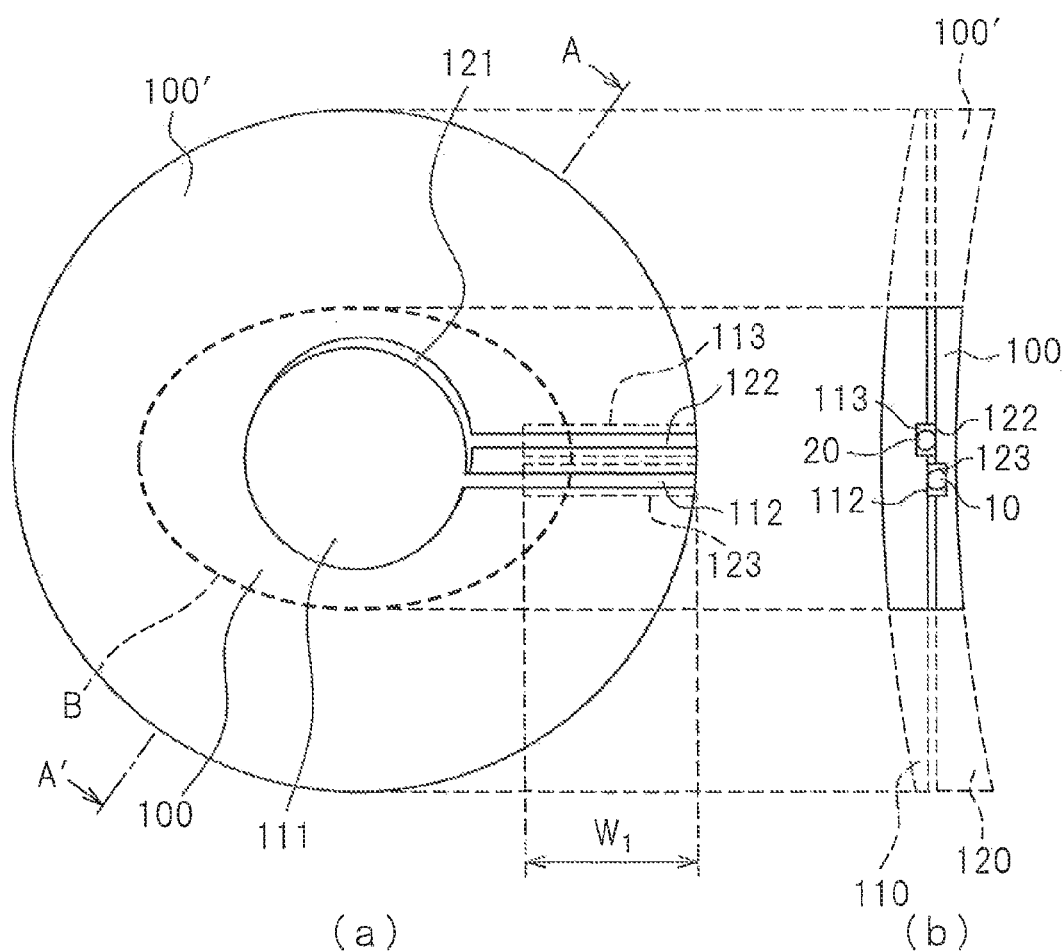
FIG. 2 is a diagram for explaining a finished lens 100' and an edged lens 100.
Figure 3:
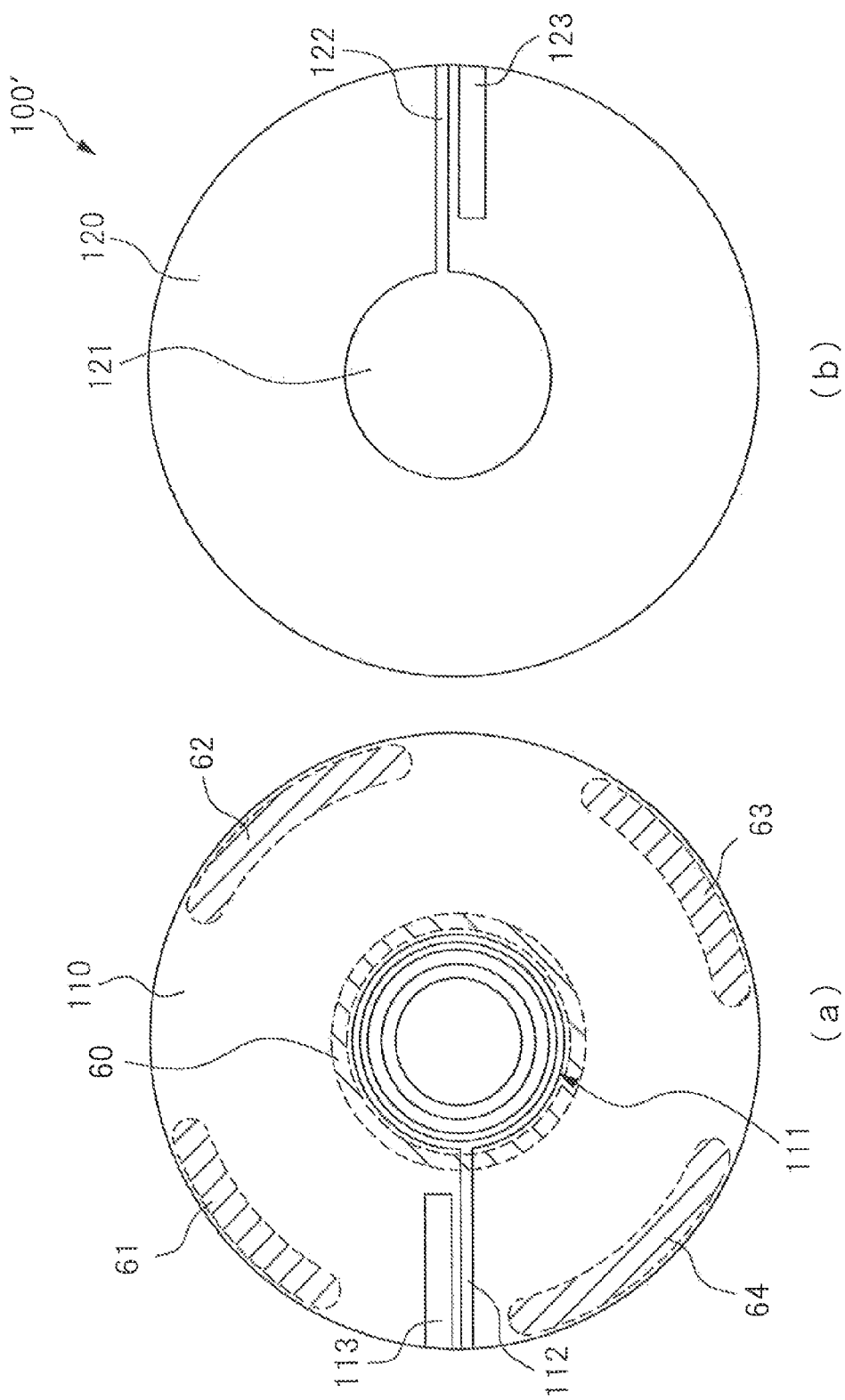
FIG. 3 is a diagram showing two transparent substrates constituting a blank lens 100".

FIGS. 2 and 3 are diagrams for explaining the edged lens 100.

FIG. 2(*a*) is a plan view of a finished lens 100' from which the edged lens 100 to be mounted to the electronic eyeglasses 1 of FIG. 1 is generated by edging its outer shape along dashed line B to fit the eyeglass frame 2 of the electronic eyeglasses 1, and FIG. 2(*b*) is a side view of the edged lens 100

FIG. 3(*a*) is a diagram showing a first transparent substrate 110 forming part of a blank lens, and FIG. 3(*b*) is a diagram showing a second transparent substrate 120 forming part of the blank lens. The first and second transparent substrates 110 and 120 are cylindrically shaped substrates. The first and second transparent substrates 110 and 120 are bonded together so as to seal therebetween a first sealing material 140, liquid crystal layer 130, etc., and the bonded structure is then ground and polished so that the outer shape has a desired lens form (for example, a concave lens), thus fabricating the pre-edging finished lens 100' as shown in FIG. 2(*a*) The details of the fabrication method will be described later.

As shown in FIG. 3(*a*), the first recessed portion 113 is formed in the first transparent substrate 110 on the side thereof to be connected to the second transparent substrate 120. The first transparent electrode 111 formed by sputtering ITO (indium tin oxide) and a first connecting line 112 connected to the first transparent electrode 111 are located on a Fresnel lens structure formed on the first transparent substrate 110.

Further, as shown in FIG. 3(*a*), the first sealing material is placed in a specific position indicated by dashed line 60 on the first transparent substrate 110, while a second sealing material is placed in four positions indicated by dashed lines 61 to 64, respectively. The number of positions where the second sealing material is placed may not be limited to four, as shown in FIG. 3(*a*), but may be, for example, six, the only requirement being that the second sealing material be placed near the outer periphery of the first transparent substrate 110; further, the second sealing material need not necessarily be formed in an arc shape, but may be formed, for example, in the shape of a straight line. However, it is preferable that the positions where the second sealing material is placed are arranged as symmetrical as possible about the center of the lens, since such arrangement serves to ensure the registration accuracy when bonding the two substrates together. The second sealing material is formed with apertures because there is a need to inject a filling material and the space between the first sealing material and the second sealing material, as will be described later. The materials and functions of the first and second sealing materials will be described later.

As shown in FIG. 3(*b*), the second recessed portion 123 is formed in the second transparent substrate 120 on the side thereof to be connected to the first transparent substrate 110. Further, a second connecting line 122 is formed in the position opposite the first recessed portion 113, while the second recessed portion 123 is formed in the position opposite the first connecting line 112. The second transparent electrode 121 formed by sputtering ITO and the second connecting line 122 connected to the second transparent electrode 121 are located on the second transparent substrate 120.

Since the first and second transparent substrates 110 and 120 formed with the respective recessed portions, before forming the transparent conductive films, etc., are identical in shape, the step of depositing films on the respective substrates is also identical, and hence the fabrication of the blank lens 100" to be described later can be accomplished easily and at relatively low cost.

As shown in FIG. 2(*b*), the first spring connector 10 attached to the eyeglass frame 2 is inserted into the second recessed portion 123 through the edge face of the edged lens 100 and brought into contact with the first connecting line 112 located inside the second recessed portion 123. Since the side face of the forward end 11 of the first spring connector 10 is pressed onto the first connecting line 112 located inside the second recessed portion 123 by the spring force exerted by the spring built into the first spring connector 10, the electrical conduction between the first spring connector 10 and the first connecting line 112 is ensured (see FIG. 6).

Likewise, as shown in FIG. 2(*b*), the second spring connector 20 attached to the eyeglass frame 2 is inserted into the first recessed portion 113 through the edge face of the edged lens 100 and brought into contact with the second connecting line 122 located inside the first recessed portion 113. Since the side face of the forward end 21 of the second spring connector 20 is pressed onto the second connecting line 122 located inside the first recessed portion 113 by the spring force exerted by the spring built into the second spring connector 20, the electrical conduction between the second spring connector 20 and the second connecting line 122 is ensured (see FIG. 6).

While the first and second recessed portions 113 and 123 have each been formed in a rectangular shape of length w1, the shape and length of the first and second recessed portions 113 and 123 are not limited to any specific shape or length, but each recessed portion may be formed, for example, in a circular or elliptical shape or in a triangular or other polygonal shape. Further, the width of each recessed portion may be suitably chosen according to the diameter, etc, of the spring connector to be inserted therein. Furthermore, each recessed portion may be formed as an opening passing through the first or second transparent substrate 110 or 120 from one side through to the other side thereof. Similarly to the recessed portion, the opening may be formed in a rectangular shape of length w1, but may not be limited to any specific shape or length; for example, the opening may be formed, in a circular or elliptical shape or in a triangular or other polygonal shape.

Figure 4:
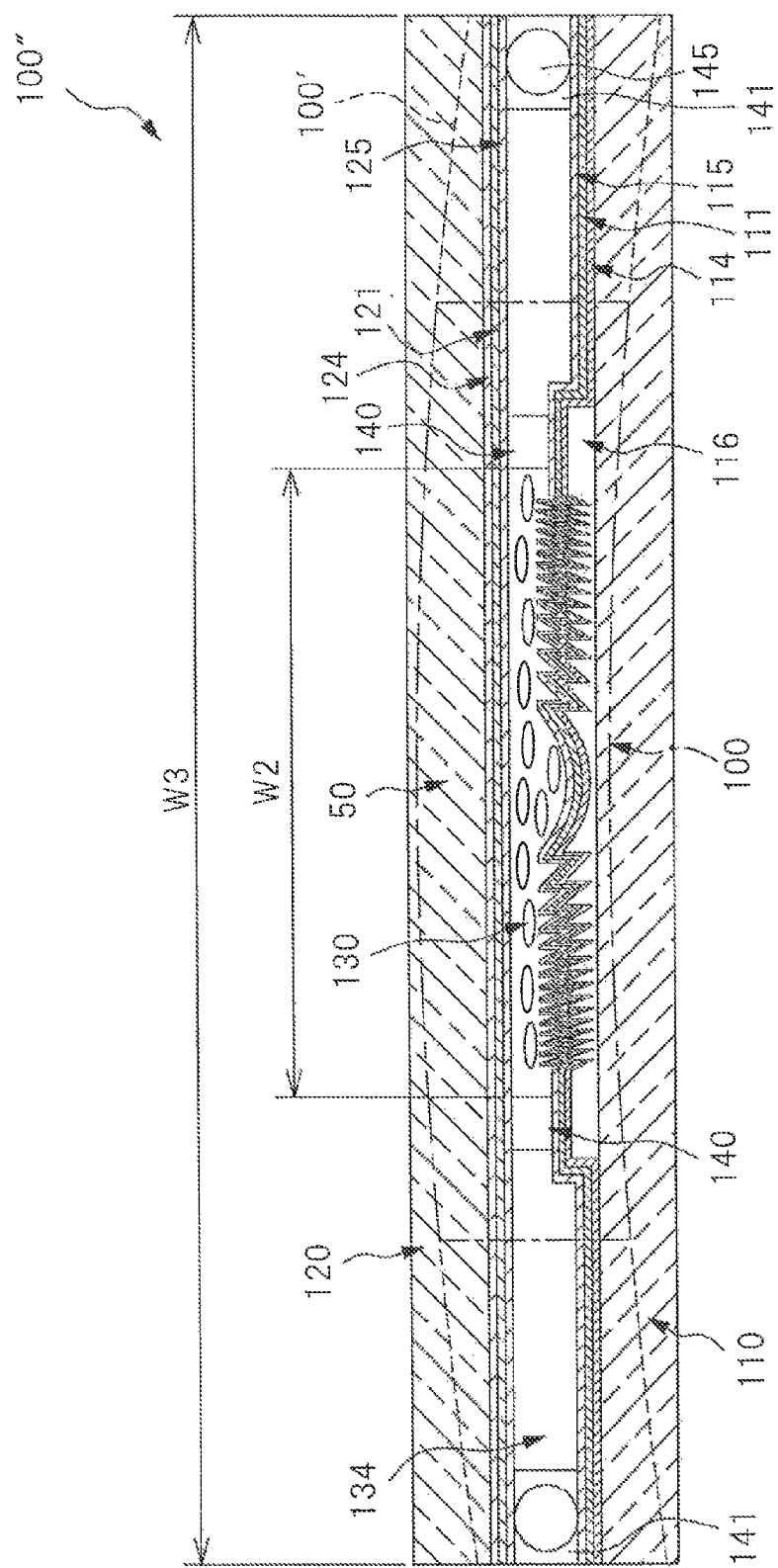
FIG. 4 is a cross-sectional view of the blank lens 100".

FIG. 4 is a cross-sectional view of the blank lens 100". In FIG. 4, the cross section indicated by dashed line 100' corresponds to the AA' cross section in FIG. 2(*a*). The blank lens here refers to a lens that has yet to be ground and polished.

As shown in FIG. 4, the blank lens 100" comprises the first transparent substrate 110, the second transparent substrate 120, the first sealing material 140 and second sealing material 141 sandwiched between the first and second transparent substrates 110 and 120, and the liquid crystal lens structure 50.

The liquid crystal lens structure 50 includes the first, transparent substrate 110, the second transparent substrate 120, the Fresnel lens structure 116, and the liquid crystal layer 130 sealed by the first sealing material 140. The liquid crystal layer 130 is formed using a homogeneously aligned liquid crystal, but use may be made of a vertically aligned liquid crystal, twisted nematic liquid crystal, hybrid aligned liquid crystal, polymer-containing liquid crystal, or cholesteric liquid crystal.

On the first transparent substrate 110, there is formed, in addition to the Fresnel lens structure 116, stack of layers includes a first gas barrier layer 114 ($SiO_2$, thickness 200 nm) for preventing gases generated from the transparent substrate from infiltrating into the liquid crystal layer 130, the first transparent electrode 111 (ITO, thickness 50 nm), and a first alignment film 115 (thickness 50 nm) overlying the first transparent electrode 111. The first gas barrier layer 114 may be formed so as to underlie the Fresnel lens structure 116.

On the second transparent substrate 120, there are formed one on top of another a second gas barrier layer 124 ($SiO_2$, thickness 200 nm) for preventing gases generated from the transparent substrate from infiltrating into the liquid crystal layer 130, the second transparent electrode 121 (ITO, thickness 50 nm) as a planar transparent electrode disposed opposite the first transparent electrode 111, and a second alignment film 125 (thickness 50 nm) overlying the second transparent electrode 121.

A plurality of spacer members 145 (diameter 10.5 μm) formed from a resin or silica are mixed into the second sealing material 141 in order to maintain the spacing between the first and second transparent electrodes 111 and 121 constant. However, the first sealing material 140 formed around the liquid crystal layer 130 does not contain any spacer members. The space between the first sealing material 140 and the second sealing material 141 is filled with a filling layer 134 formed from a transparent resin. The first sealing material 140 is located in a specific position indicated by dashed line 60 in FIG. 3(a), while the second sealing material 141 is divided into four segments and located in four positions indicated by dashed lines 61 to 64, respectively.

The first and second transparent substrates 110 and 120 are each formed from a cylindrically shaped polycarbonate material of thickness 5 mm, but the thickness is not limited to this particular value, nor is the material limited to polycarbonate, and use may be made of other plastic material such as an acrylic or urethane material, or alternatively, glass may be used as the substrate material. While the substrates are shown as being planar in shape, what matters is the bonding gap, and the shape is not limited to a planar shape; for example, curved substrates may be bonded together. The Fresnel lens structure 116 is formed using an acrylic material, but use may be made of other optical material such as a cyclic olefin-based transparent resin, a radically polymerized acrylic-based US-curable resin, a cationic polymerized epoxy-based UV-curable resin, a thermosetting resin, or an inorganic/organic hybrid material. When forming the Fresnel lens structure 116 using a photo-curable resin, at least the substrate on the side to be irradiated with ultraviolet radiation needs to be formed from a material permeable to ultraviolet radiation.

In FIG. 4, w2 indicates the width of the liquid crystal lens structure 50, and in the example of FIG. 4, w2=20 mm; on the other hand, w3 indicates the outer dimension of the finished lens 100', and in the example of FIG. 4, w3=75 mm. However, these values are only examples, and other suitable values may be employed.

In FIG. 4, it should be noted that, for convenience of explanation, the thickness of each substrate and the relative thicknesses of the layers are not necessarily drawn to scale. Further, in FIG. 4, the outer shape of the edged lens 100 to be mounted to the eyeglass frame is shown by semi-dashed lines.

Figure 5:
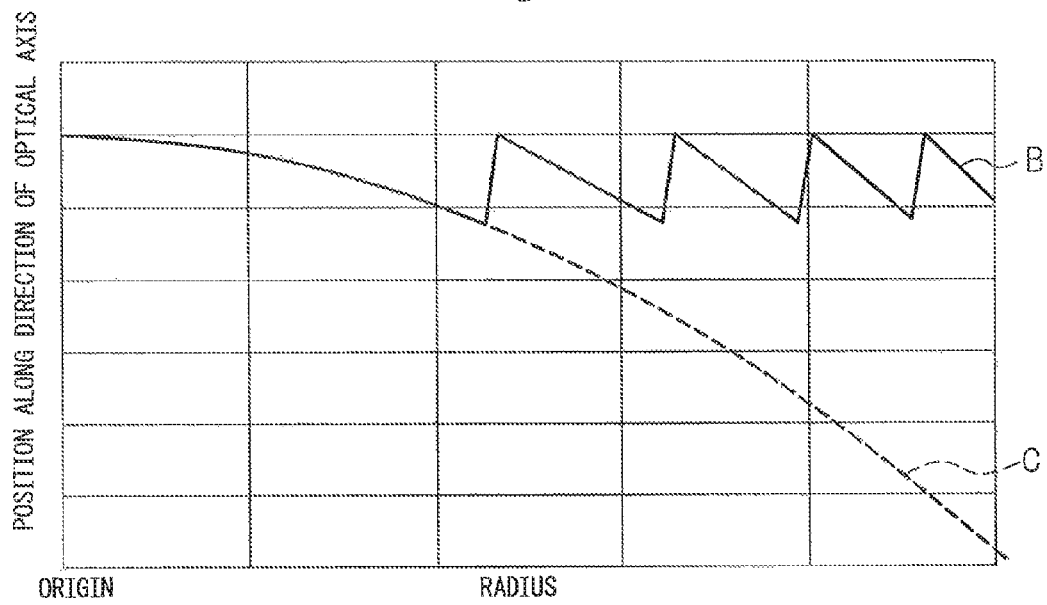
FIG. 5 is a diagram for explaining the structure of a Fresnel lens surface generated by a liquid crystal lens structure.

FIG. 5 is a diagram for explaining the structure of the Fresnel lens surface generated by the liquid crystal lens structure.

FIG. 5 shows a cross section of the Fresnel lens surface taken along the radial direction with the vertex of the Fresnel lens surface (i.e., the point on the lens surface that lies on the optical axis) as the origin. In the figure, the abscissa represents the position taken along the radial direction, and the ordinate represents the position taken along the direction of the optical axis.

Dashed line C in FIG. 5 indicates the lens surface that defines the original lens characteristics of the liquid crystal lens structure 50. The lens surface is designed as a continuous curved surface symmetrical about the optical axis, as in the conventional lens. Then, by providing steps on the lens surface so that the position on the lens surface, taken along the direction of the optical axis, coincides with the position of the vertex, the cross-sectional shape B of the Fresnel structure shown in FIG. 5 is generated (each slanted face of the Fresnel structure 116 is shown as a straight line in the figure for convenience of illustration, but actually it is curved like the dashed line C). This results in the generation of the Fresnel lens surface having a plurality of zones divided by the steps. In FIG. 5, the Fresnel lens structure is shown as having four zones, but the number of zones shown is only one example, and is not limited to four.

Figure 6:
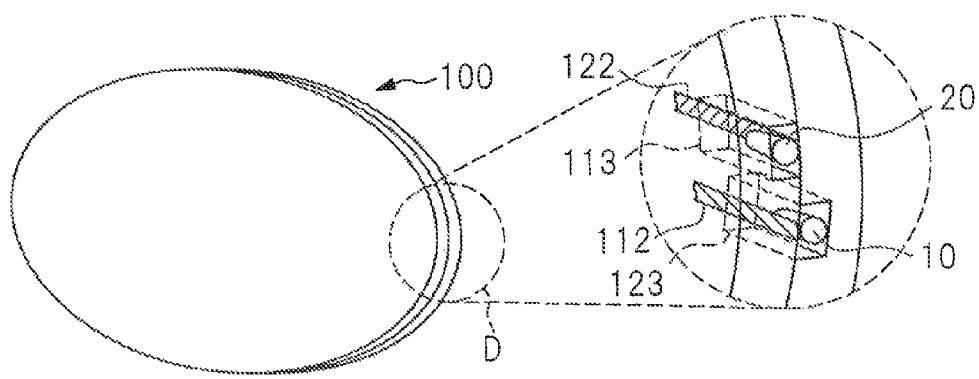
FIG. 6 is a diagram illustrating how spring connectors are connected to the edged lens 100.

FIG. 6 is a diagram illustrating how the spring connectors are connected to the edged lens 100.

An enlarged view of the portion of the edged lens 100 encircled by dashed line D is also shown in FIG. 6. As described earlier, since the side face of the first spring connector 10 is pressed onto the first connecting line 112 located inside the second recessed portion 123 by the spring force exerted by the spring built into the first spring connector 10, the electrical conduction between the first spring connector 10 and the first connecting line 112 is ensured. Similarly, since the side face of the second spring connector 20 is Dressed onto the second connecting line 122 located inside the first recessed portion 113 by the spring force exerted by the spring built into the second spring connector 20, the electrical conduction between the second spring connector 20 and the second connecting line 122 is ensured. The method of connecting the spring connectors to the edged lens 100 is not limited to the above method, but another suitable method may be employed.

In the case of the above-described finished lens 100', if the edged lens 100 is generated by cutting the lens at any position located along the width w1 of the first and second recessed portions 113 and 123 shown in FIG. 2(a), the spring connectors can be connected by inserting them through the edge face of the edged lens 100 (see FIG. 6). Accordingly, the outer shape of the edged lens 100 is not determined in advance, and the edged lens 100 can be generated to fit the frame of any given shape.

Figure 7:
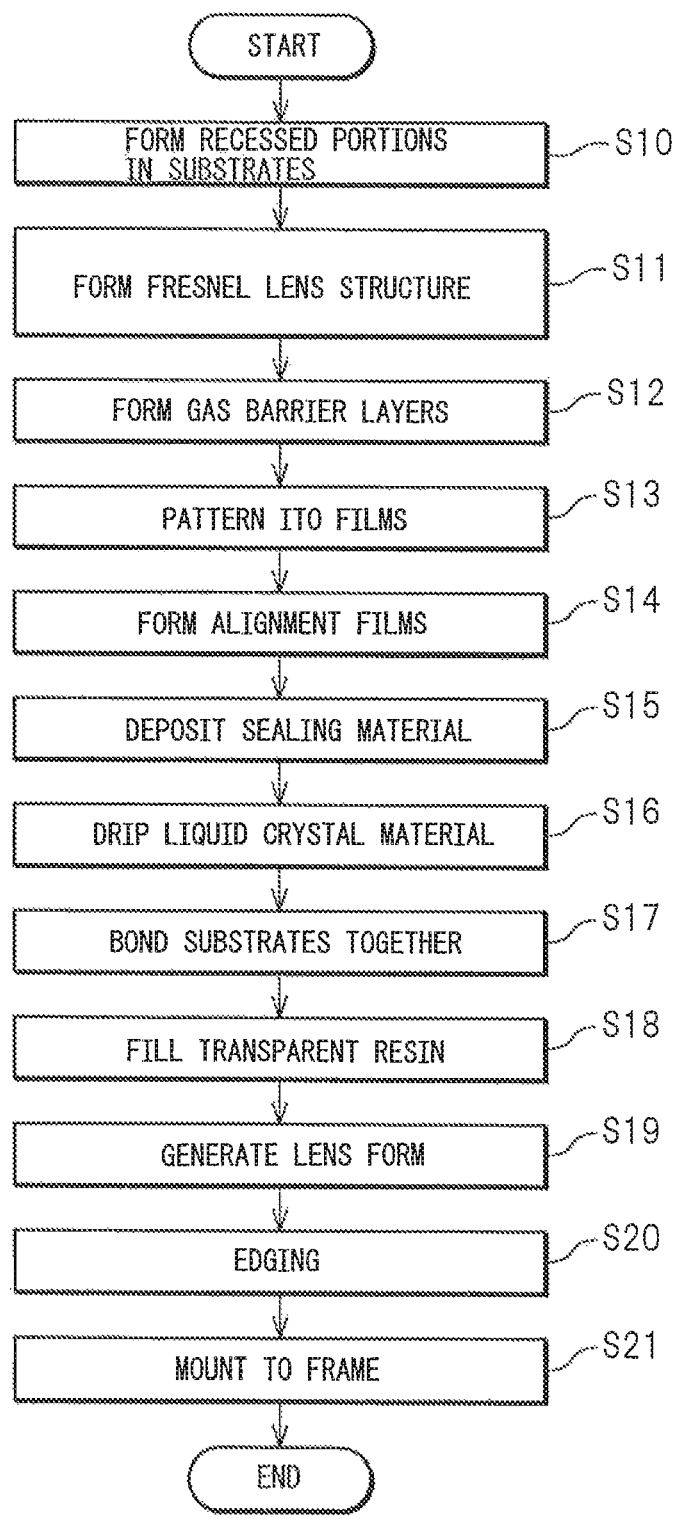
FIG. 7 is a flow diagram showing a manufacturing process for the edged lens 100.

The manufacturing process of the edged lens 100 will be described below with reference to FIGS. 7 and 8.

First, the first recessed portion 113 is formed in the cylindrically shaped first transparent substrate 110 (thickness 5 mm) by cutting, and the second recessed portion 123 is formed in the cylindrically shaped second transparent substrate 120 (thickness 5 mm) by cutting (S10).

Next, the Fresnel lens structure 116 is formed on the first transparent substrate 110 (S11). To form the Fresnel lens structure 116, a photo-curable resin 210 is dripped in a prescribed amount from a dispenser 200 onto the first transparent substrate 110 (see FIG. 8(*a*)), and after forming the photo-curable resin 210 in a given shape by a mold 201 (see FIGS. 8(*b*) and 8(*c*)), ultraviolet rays (UV) are radiated from below the first transparent substrate 110 (see FIG. 8(*c*)), causing the photo-curable resin 210 to cure (see FIG. 8(*d*)). In FIG. 8(*d*), the area of the cured photo-curable resin 210 including the Fresnel lens structure 116 is shown as being smaller than the first transparent substrate 110, but the structure may be formed over the entire surface of the first transparent substrate 110.

A UV-curable acrylic resin may be used as the photo-curable resin 210. In an alternative method, the Fresnel lens structure may be formed separately, and the completed Fresnel lens structure may be bonded onto the first transparent substrate 110. Alternatively, the Fresnel lens structure may be formed by cutting the first transparent substrate, as in the case of the first recessed portion 113, or may be formed integrally with the transparent substrate by casting or injection molding.

Next, the first gas barrier layer 114 and the second gas barrier layer 124, each made of a $SiO_2$ film with a thickness of 200 nm, are formed on the first transparent substrate 110 on which the Fresnel lens structure 116 has been formed and the second transparent substrate 120, respectively (S12).

Next, an ITO film is deposited over the first gas barrier layer 114 of the first transparent substrate 110, and the deposited ITO film is patterned to form the first transparent electrode 111 and the first connecting line 112. Similarly, an ITO film is deposited over the second gas barrier layer 124 of the second transparent substrate 120, and the deposited ITO film is patterned to form the second transparent electrode 121 and the second connecting line 122 (S13).

Next, the first alignment film 115 is formed on the first transparent electrode 111 of the first transparent substrate 110, and rubbing is performed. Similarly, the second alignment film 125 is formed on the second transparent electrode 121 of the second transparent substrate 120, and rubbing is performed (S14).

Figure 8:
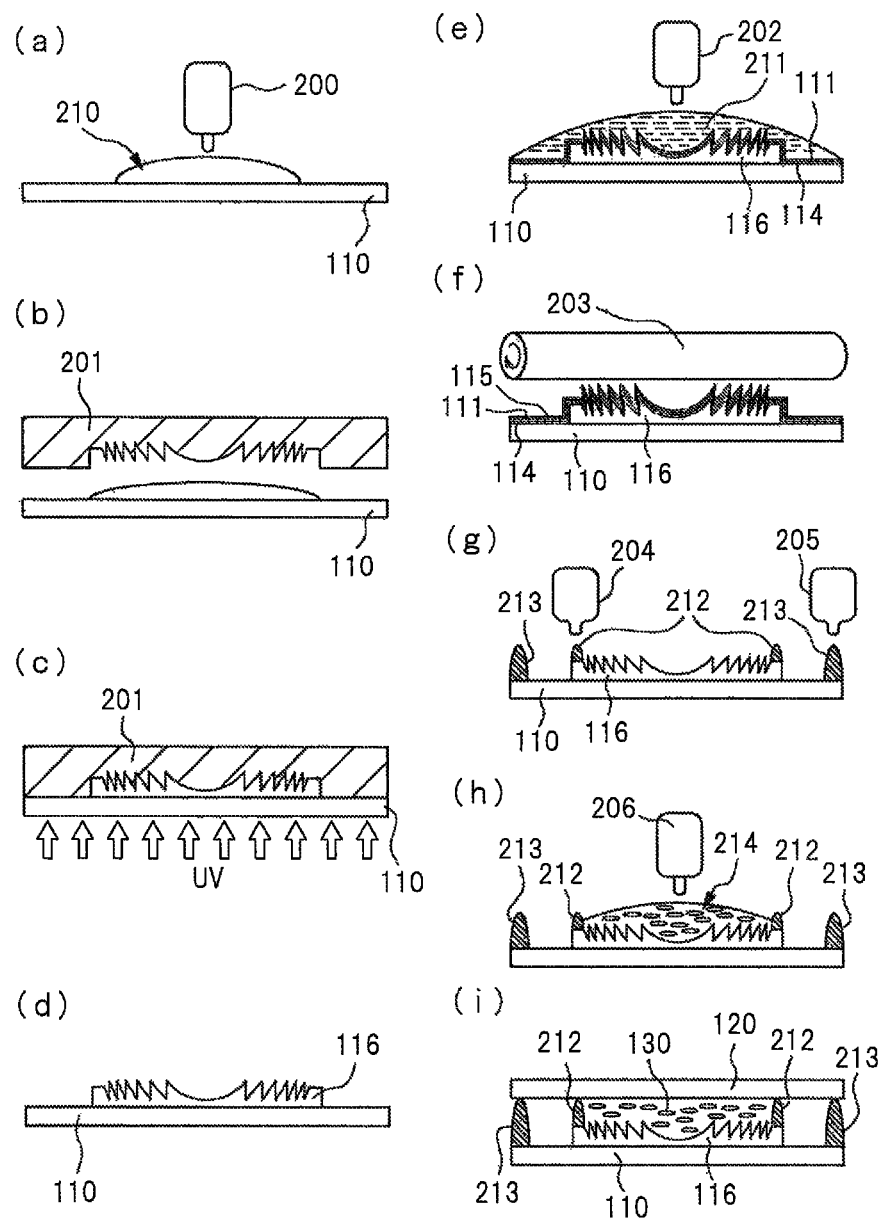
FIG. 8 is a diagram for explaining the manufacturing process for the edged lens 100.

The formation of each alignment film is performed, for example, by dripping a film forming material 211 in a prescribed amount from a dispenser 202 (see FIG. 8(*e*)), drying (baking) it in a prescribed atmosphere, and thereafter rubbing the film by using a roller 203 (see FIG. 8(*f*)).

Next, to form the first sealing material 140, a photo-curable resin 212 that does not contain spacer members 145 is dispensed from a dispenser 204 onto the specified position (the position indicated by dashed line 60 in FIG. 3(*a*)) on the first transparent substrate 110. Further, to form the second sealing material 141, a photo-curable resin 213 that contains spacer members 145 is dispensed from a dispenser 205 onto the specified positions (the positions indicated by dashed lines 61 to 64 in FIG. 3(*a*)) on the first transparent substrate 110 (S15, see FIG. 8(*g*)). Preferably, the first sealing material 140 is formed by using a material that, when cured, has substantially the same refractive index as the first and second transparent substrates 110 and 120. In FIGS. 8(*g*) to 8(*i*), the first gas barrier layer 114, the first transparent electrode 111, and the first alignment film 115 are omitted for convenience of illustration.

Next, a liquid crystal material 214 is dripped in a prescribed amount from a dispenser 206 into the inside space enclosed by the photo-curable resin 212 (S16, see FIG. 8(*h*)).

Next, the second transparent substrate 120 is laid over the first transparent substrate 110 in a vacuum atmosphere (see FIG. 8(*i*)), and the region where the liquid crystal material 214 is deposited is masked to protect it from UV radiation; in this condition, UV rays are radiated from below the first transparent substrate 110. Thereupon, the photo-curable resins 212 and 213 are cured to form the first and second sealing materials 140 and 141, respectively, and the first and second transparent substrates 110 and 120 are thus bonded together (S17). The spacers (not shown) mixed into the photo-curable resin 213 serve to maintain a certain gap between the first transparent substrate 110 and the second transparent substrate 120. The liquid crystal material 214 dripped as described above is sandwiched between the first and second transparent substrates 110 and 120 and sealed by the first sealing material 140, thus forming the liquid crystal layer 130. When forming the first and second sealing materials 140 and 141 by curing the above resins, the entire structure may be baked in a high-temperature atmosphere after the UV radiation.

Next, the structure manufactured by bonding together the first and second transparent substrates 110 and 120 is placed in a vacuum atmosphere, and a transparent resin is filled by capillary action into the space between the first sealing material 140 and the second sealing material 141 to form the filling layer 134 (S18). The transparent resin used here to form the filling layer 134 has substantially the same refractive index as the first and second transparent substrates 110 and 120. The fabrication of the blank lens (the outer shape of the lens is not formed yet) is thus completed. The filling layer 134 serves to increase the transmissivity of the lens, provide the adhesive strength enough to withstand the forces applied during lens processing, and prevent abrasive material, abrasive liquid, etc., from entering inside. While the transparent resin for forming the filling layer 134 has been described as being filled into the space between the first sealing material 140 and the second sealing material 141 after the first and second transparent substrates 110 and 120 have been bonded together, the transparent resin may be applied after forming the second sealing material 141 but before bonding together the first and second transparent substrates 110 and 120, and the first and second transparent substrates 110 and 120 may be bonded together by curing the transparent resin simultaneously with the first and second sealing materials 140 and 141. In that case, the second sealing material 141 need not be provided with apertures, but may be formed in a continuous structure.

Next, the outer shape of the blank lens is processed by grinding and polishing to generate the desired lens form, completing the fabrication of the finished lens 100' (S19). The generation of the lens form is performed on one side at a time, and the lens with only one side finished is referred to as a semi-finished lens.

Next, the finished lens 100' shown, for example, in FIG. 4 is edged to fit the shape of the eyeglass frame 2, completing the generation of the edged lens 100 (S20); then, the edged lens 100 is mounted in the eyeglass frame 2 with the spring connectors 10 and 20 electrically connected to the liquid crystal lens structure 50, thus completing the fabrication of the electronic eyeglasses 1 (S21).

In the condition of the blank lens 100" (see FIG. 4), the second sealing material 141 with the spacer members 145 mixed therein is formed around the periphery of the lens, while the first sealing material 140 is formed around the liquid crystal lens structure 50, and the space created between the first sealing material 140 and the second sealing material 141 is filled with the filling layer 134. Accordingly, the cell gap of the liquid crystal lens structure 50 is maintained at a prescribed thickness, although the spacer members 145 are not mixed in the first sealing material 140. When the finished lens 100' (indicated by dashed lines in FIG. 4) is thereafter generated by grinding and polishing, the cell gap of the liquid crystal lens structure 50 is likewise maintained at the prescribed thickness. Further, when the edged lens 100 (indicated by semi-dashed lines in FIG. 4) is thereafter produced by edging, since the second sealing material 141 formed around the periphery is removed during the edging and the spacer members 145 no longer remain in the edged lens 100, the viewing field of the wearer of the lens is not affected, nor does the wearer feel uncomfortable when viewing through the lens. The absence of the spacer members 145 also has the effect of improving transparency.

In the manufacturing process of the edged lens 100, the liquid crystal lens structure 50 is subjected to the greatest pressure when generating the finished lens by grinding; at this time, as long as the second sealing material 141 with the spacer members 145 mixed therein is sound, the cell gap of the liquid crystal lens structure 50 is maintained at the prescribed thickness. After the finished lens is edged to generate the edged lens 100, the cell gap of the liquid crystal lens structure 50 is substantially maintained at the prescribed thickness by means of the first sealing material 140 and the filling layer 134 remaining around the outer periphery thereof.

Thus, the major feature of the above liquid crystal lens is that during the processing when pressures are applied to the liquid crystal lens structure 50, the second sealing material 141 with the spacer members 145 mixed therein is present but, when the lens is edged to fit the eyeglass frame 2, the second sealing material 141 with the spacer members 145 mixed therein is no longer present.

Figure 9:
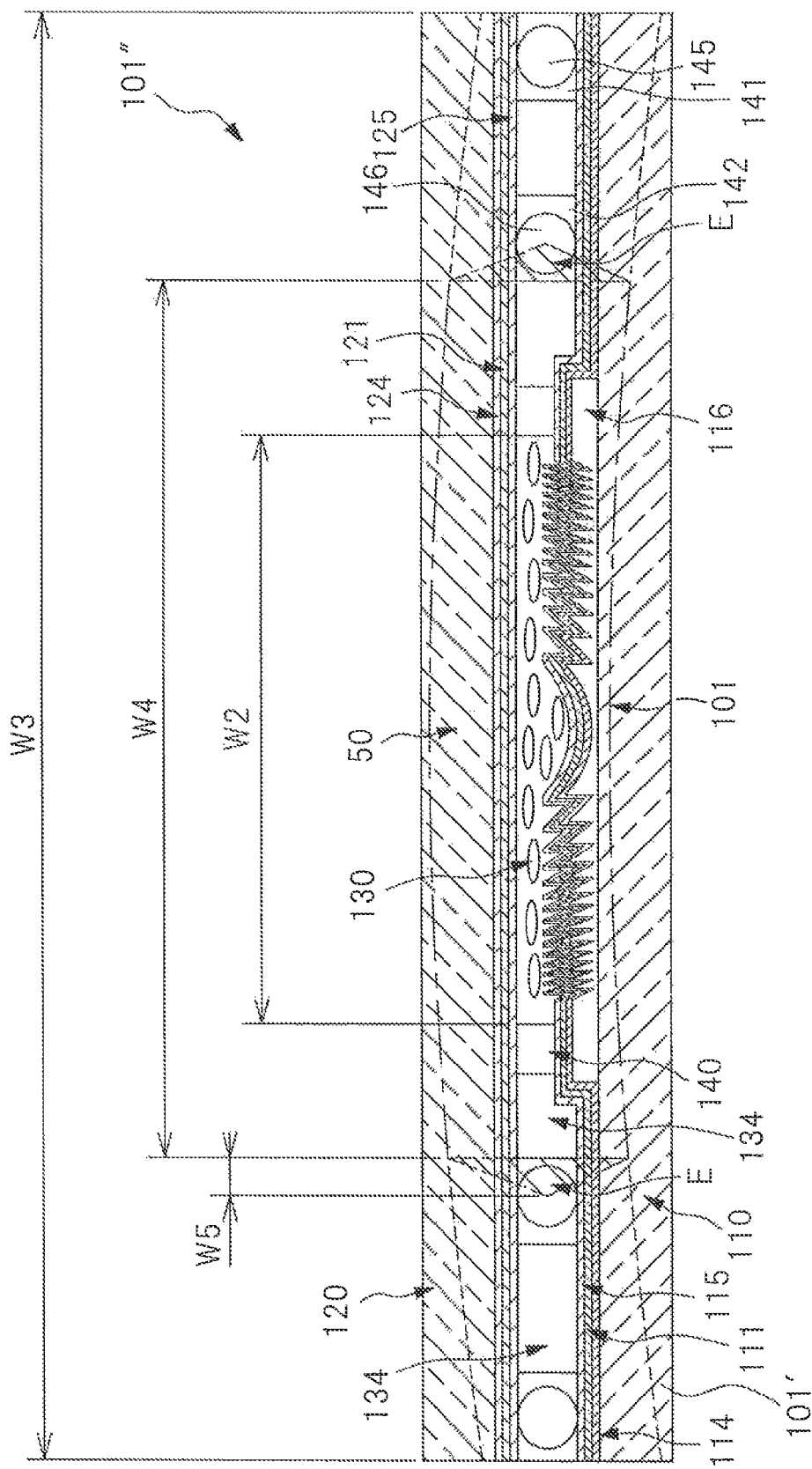
FIG. 9 is a cross-sectional view of an alternative blank lens 101".

FIG. 9 is a cross-sectional view of an alternative blank lens 101".

In FIG. 9, the same component members as those in FIG. 4 are designated by the same reference numerals, and the description thereof will not be repeated here. The blank lens 101" shown in FIG. 9 is ground and polished to generate a finished lens 101', and the finished lens 101' is edged to generate an edged lens 101 which is mounted to the eyeglass frame 2.

The blank lens 101" shown in FIG. 9 differs from the blank lens 100" shown in FIG. 4 by the inclusion of a third sealing material 142 that contains spacer members 146, the structure being such that, when the edged lens 101 is generated, the entire or part of the third sealing material 142 remains in the beveled edge F of the edged lens 101. The spacer members 146 may be formed from the same material as the earlier described spacer members 145. However, depending on the structure, there may arise a need to make the particle size of the spacer members 145 different from that of the spacer members 145. In FIG. 9, W4 represents the width of the edged lens 101 excluding the beveled edge E thereof, and W5 the height of the beveled edge E.

Since the beveled edge E shown in FIG. 9 is fitted into the groove formed on the inside of the eyeglass frame 2, it does not interfere with the viewing field of the eyeglass wearer. Accordingly, if any spacer members 146 are contained in this portion, the earlier described problem does not occur; rather, the presence of even a portion of the sealing material during the edging serves to make the structure sturdier, making it possible to maintain the cell, cap of the liquid crystal lens structure 50 constant and to achieve good surface accuracy.

The beveled edge E contains a portion of the third sealing material 142 containing the spacer members 146, but since the beveled edge E does not, in effect, affect the viewing field of the eyeglass wearer, it can be said that the edged lens 101 completed by edging in FIG. 9 does not, in effect, contain any spacer members.

Figure 10:
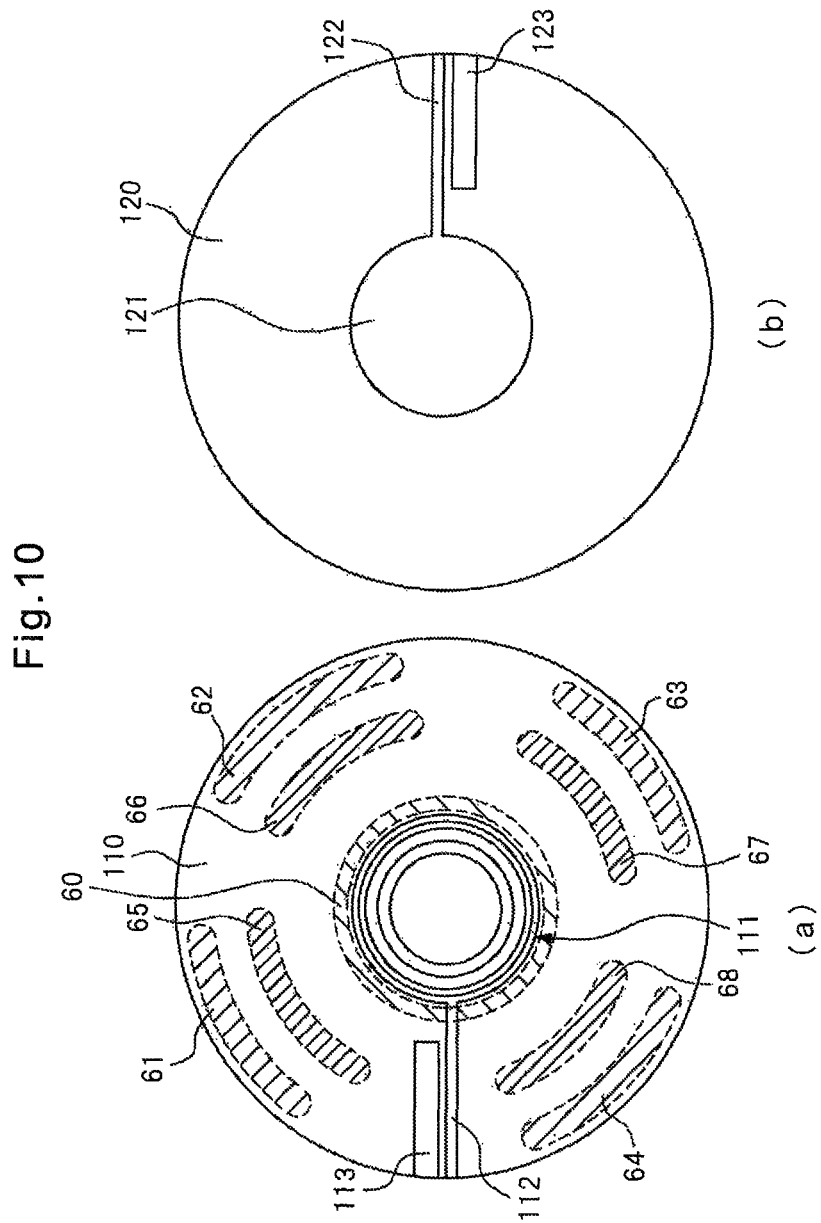
FIG. 10 is a diagram showing two transparent substrates constituting the blank lens 101" of FIG. 9.

FIG. 10 is a diagram showing the two transparent substrates constituting the blank lens 101" of FIG. 9.

As shown in FIG. 10(a), the first sealing material 140 is located in a specific position indicated by dashed line 60 on the first transparent substrate 110, and the second sealing material 141 is located in four positions indicated by dashed lines 61 to 64, respectively, while the third sealing material 142 is located in four positions indicated by dashed lines 65 to 68, respectively. The number of positions where the second sealing material 141 is placed may not be limited to four, as shown in FIG. 10(a), but may be, for example, six, the only requirement being chat the second sealing material 142 be placed near the outer periphery of the first transparent substrate 110; further, the second sealing material 141 need not necessarily be formed in an arc shape, but may be formed, for example, in a straight line. Likewise, the number of positions where the third sealing material 142 is placed may not be limited to four, as shown in FIG. 10(a), but may be, for example, six, the only requirement being that the third sealing material 142 be placed between the first and second sealing materials 140 and 142 at a position corresponding to the beveled edge of a lens shape known in advance. However, it is preferable that the positions where the second and third sealing materials 141 and 142 are placed are arranged as symmetrical as possible about the center of the lens, since such arrangement serves to ensure the registration accuracy when bonding the two substrates together. The second and third sealing materials 141 and 142 are each formed with apertures because there is a need to inject a filling material into the space between the first sealing material 140 and the second sealing material 141.

Figure 11:
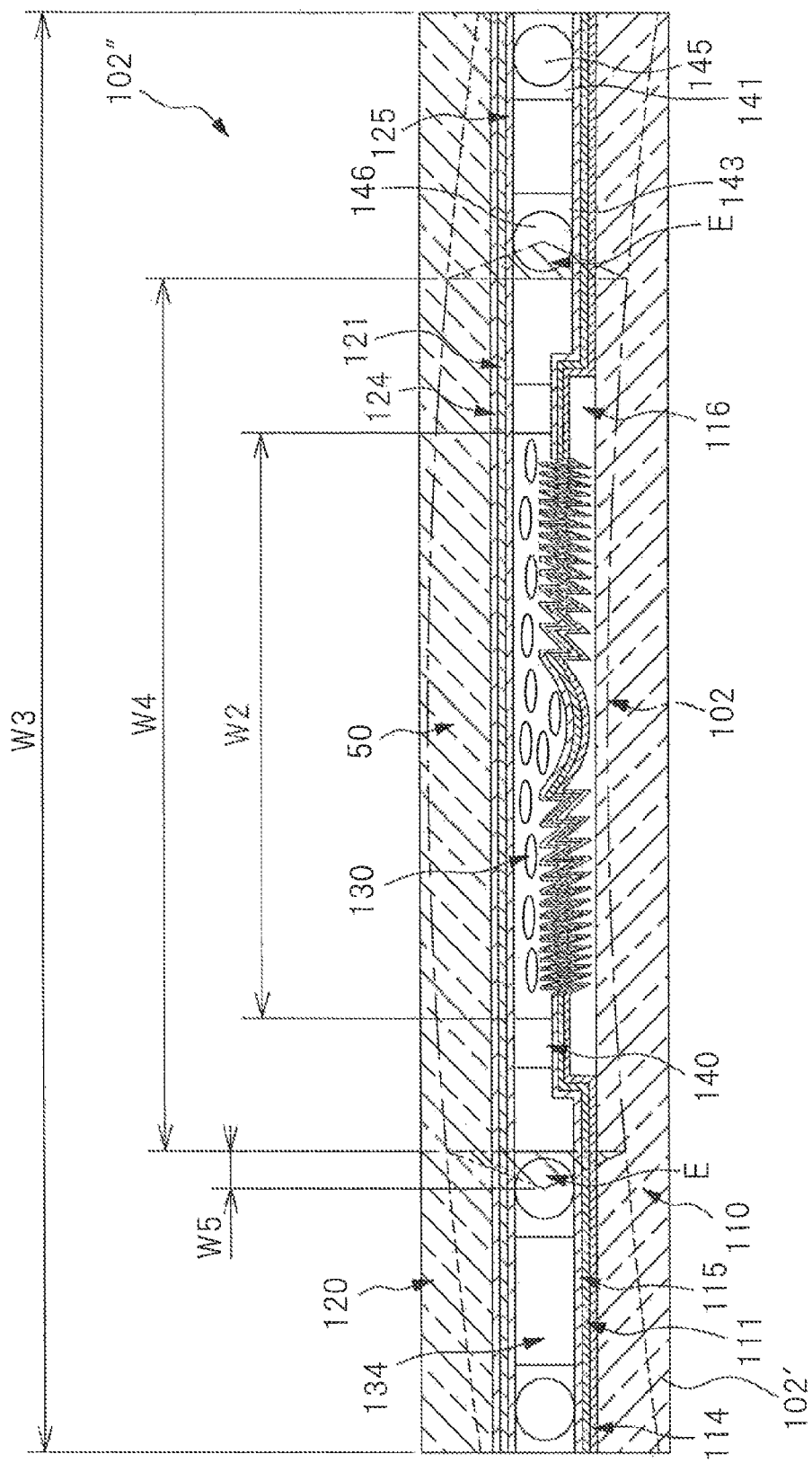
FIG. 11 is a cross-sectional view of another alternative blank lens 102".

FIG. 11 is a cross-sectional view of another alternative blank lens 102".

In FIG. 11, the same component members as those in FIG. 9 are designated by the same reference numerals, and the description thereof will not be repeated here. The blank lens 102" shown in FIG. 11 is ground and polished to generate a finished lens 102', and the finished lens 102' is edged to generate an edged lens 102 which is mounted to the eyeglass frame 2.

The blank lens 102" shown in FIG. 11 differs from the blank lens 101" shown in FIG. 9 only in that the third sealing material 143 containing the spacer members 146 is colored. Since the beveled edge E of the edged lens 102 is fitted into the groove formed on the inside of the eyeglass frame 2, the colored sealing material does not affect the viewing field, of the eyeglass wearer. Rather, the colored sealing material can provide an aesthetic visual effect to the design of the eyeglass frame 2, offering the further advantage of being able to give an impression different from that of an all-transparent lens. The color used may be the same as the color of the eyeglass frame or may be any other color such as black, brown, or red.

The beveled edge E (W5) contains a portion of the third sealing material 143 containing the spacer members 146, but since the beveled edge E does not, in effect, affect the viewing field of the eyeglass wearer, it can be said that the edged lens 102 completed by edging in FIG. 11 does not, in effect, contain any spacer members.

Figure 12:
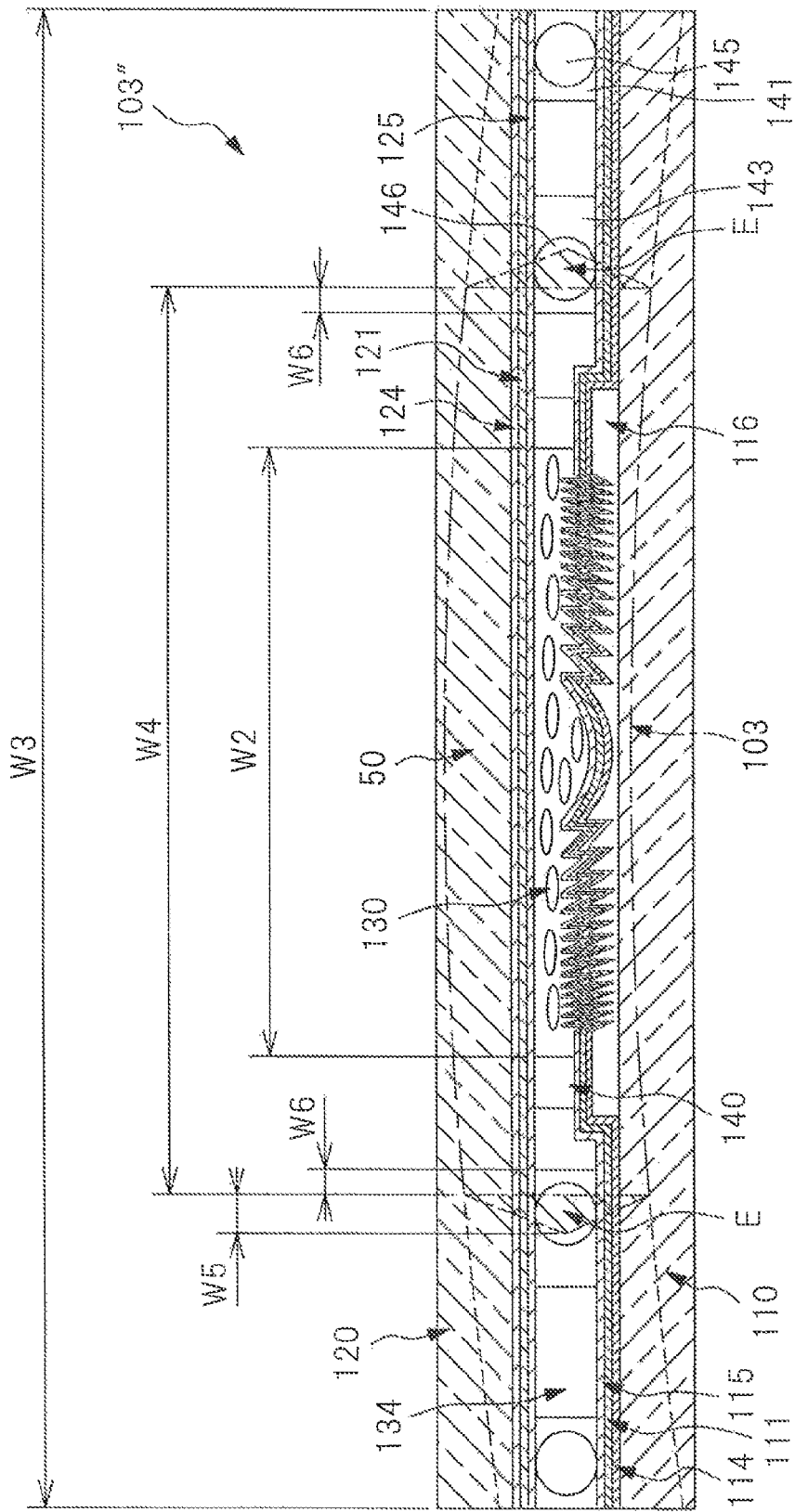
FIG. 12 is a cross-sectional view of still another alternative blank lens 103".

FIG. 12 is a cross-sectional view of still another alternative blank lens 103".

In FIG. 12, the same component members as those in FIG. 9 are designated by the same reference numerals, and the description thereof will not be repeated here. The blank lens 103 shown in FIG. 12 is ground and polished to generate a finished lens 103', and the finished lens 103 is edged to generate an edged lens 103 which is mounted to the eyeglass frame 2.

The blank lens 103" shown in FIG. 12 differs from the blank lens 101" shown in FIG. 9 only in that the third sealing material 143 contains colored spacer members 146 and is formed so as to extend inwardly of the beveled edge E by a width W6. The width W6 may be set within a range that does not, in effect, affect the viewing field of the eyeglass wearer, and may be set, for example, to 1 to 5 mm. By increasing the colored region within a range that does not affect the viewing field, the design performance can be further enhanced. By varying or eliminating the width W6 according to the position on the edged lens 103, the design of the product including the eyeglass frame can be further enhanced. Furthermore, since much of the third sealing material 143 containing the spacer members 146 remains in the lens, it becomes possible to further accurately maintain the cell gap of the liquid crystal lens structure 50 constant and to achieve better surface accuracy.

The regions corresponding to the beveled edge E (W5) and the width W6 contain a portion of the third sealing material 143 containing the spacer members 146, but since these regions do not, in effect, affect the viewing field of the eyeglass wearer, it can be said that the edged lens 103 completed by edging in FIG. 12 does not, in effect, contain any spacer members.

Figure 13:
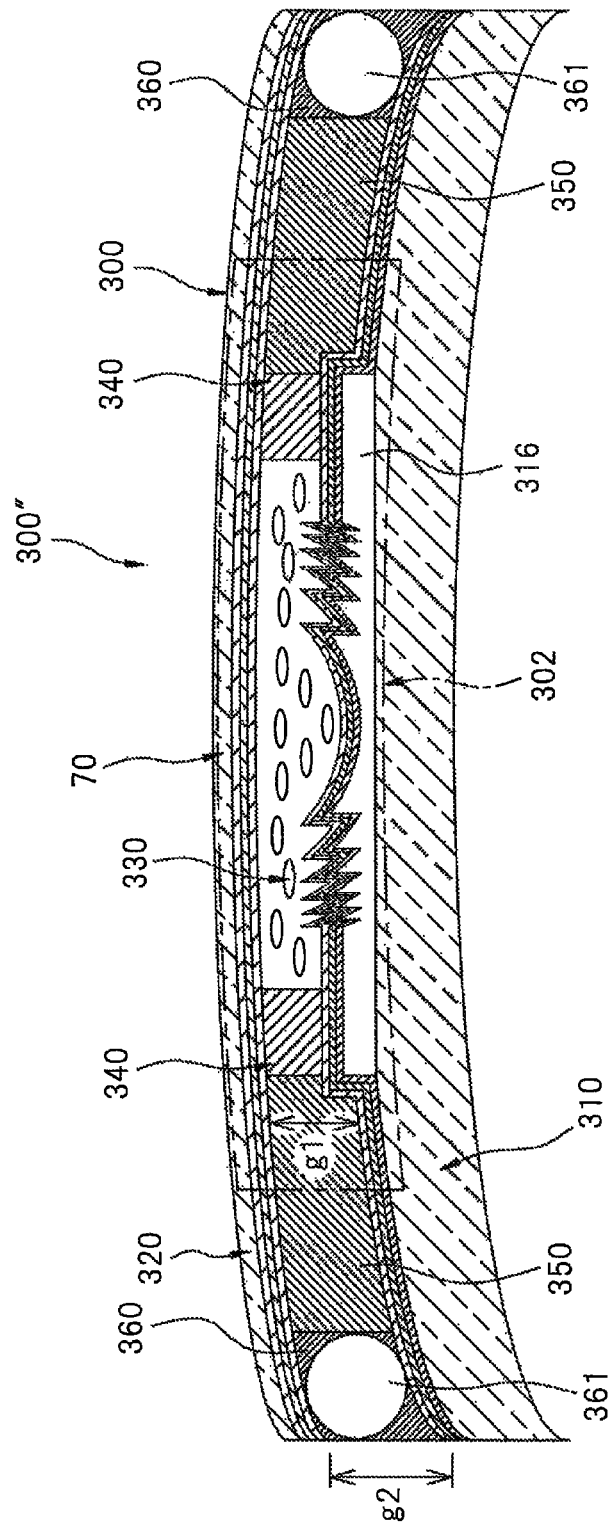
FIG. 13 is a cross-sectional view of a further alternative blank lens 300".
Figure 14:
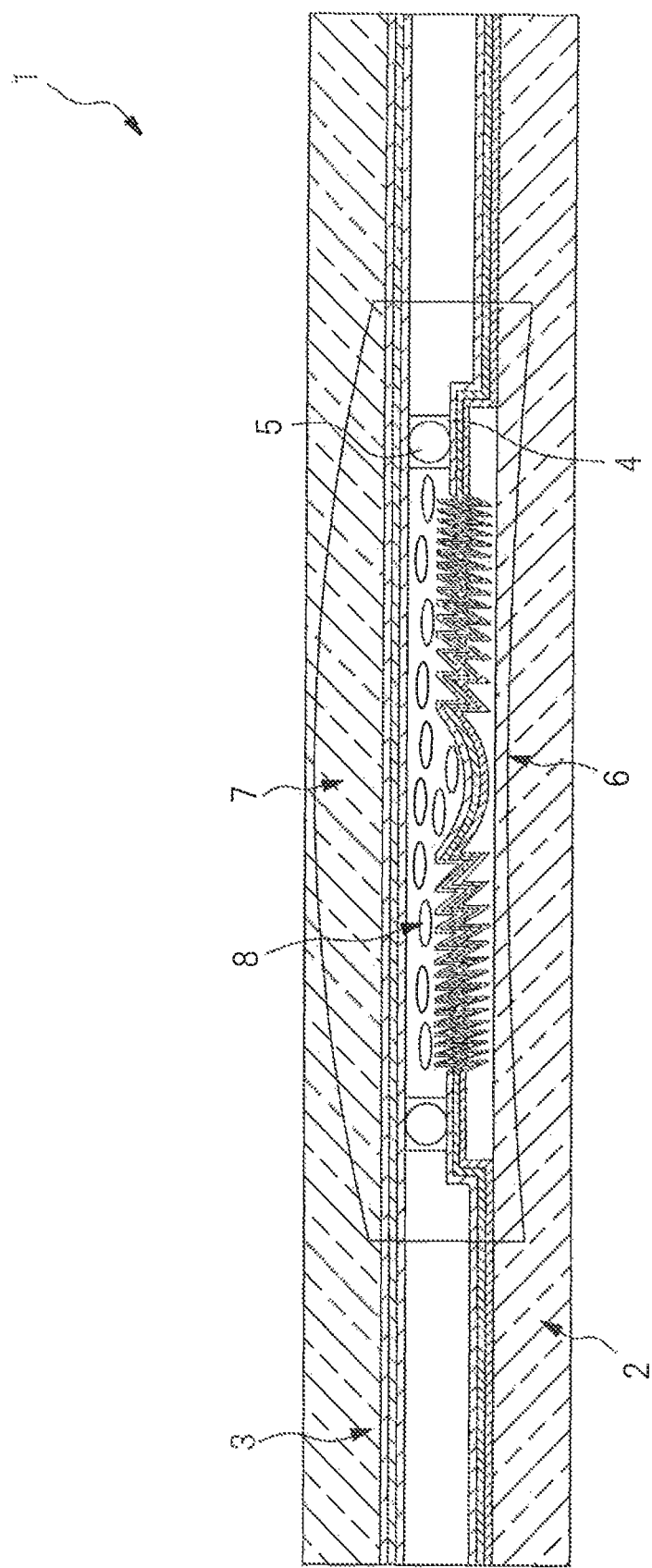
FIG. 14 is a cross-sectional view of a blank lens 1.

FIG. 13 is a cross-sectional view of a further alternative blank lens 300".

The blank lens 300" shown in FIG. 13 differs from the previously shown blank lens 100" in that the first transparent substrate 310 has a curved cross-sectional shape convex upward, and in that the second transparent substrate 320 is a thin, flat, and flexible substrate which is formed in a convex-upward curved shape during the manufacturing process. In other respects, the structure is the same as that of the previously shown blank lens, and the same component elements will not be described in detail herein. The liquid crystal lens structure 70 shown here comprises, in addition to the first and second transparent substrates 310 and 320, a Fresnel lens structure 316 and a liquid crystal layer 330 sealed by a sealing material 340.

An outside sealing material 360, which contains outside spacers 361, is formed around the edges of the blank lens 300" everywhere except a portion or portions left on the circumference for forming an injection port through which to inject an adhesive material. While the outside sealing material 360 contains outside spacers 361, the inside sealing material 340 does not contain any spacers. As a result, the gap g1 provided between the first and second transparent substrates 310 and 320 by the inside sealing material 340 is smaller than the gap g2 at the substrate edges.

When the second transparent substrate 320 is pressed under pressure onto the first transparent substrate 310 in the substrate bonding step, the second transparent substrate 320 which is a flexible substrate is formed in a curved shape to conform with the curved shape of the first transparent substrate 310. At this time, with the presence of the sealing material 360, the gap g2 between the first and second transparent substrates 310 and 320 at the substrate edges is maintained larger than the gap g1 at the sealing material 340. In the resin injection step, this promotes the capillary action, making it easier to inject the transparent adhesive material into the gap.

The fabrication method of the edged lens 300 differs from the fabrication method of the edged lens 100 in that after the photo-curable resin for forming the inside sealing material 340 is deposited by dripping in the sealing material deposition step, the process proceeds to the outside sealing material deposition step where the photo-curable resin containing the outside spacers 361 for forming the outside sealing material 360 is deposited around the periphery of the first transparent substrate 310, i.e., the edges of the blank lens 300", by dripping the material from a dispenser. In this case, the material is deposited all around the periphery, except a portion or portions left discontinuously on the circumference for forming the adhesive material injection port in the outside sealing material 360. After that, UV radiation is applied to cure the photo-curable resin, completing the formation of the outside sealing material 360. Then, the process proceeds through the liquid crystal injection step to the resin injection step where the transparent adhesive material is injected through the injection port formed in the outside sealing material 360. After that, UV radiation is once again applied to cure the transparent adhesive material, completing the formation of the filling layer 350. In other respects, the fabrication method is the seine as that of the previously shown edged lens 100.

Since the large spacers 361 are interposed between the first and second transparent substrates 310 and 320, the gap provided between the first and second transparent substrates 310 and 320 outside the sealing material 340 can be made smaller at g1 near the sealing material 340 than at g2 at the substrate edges. Accordingly, in the blank lens 300", the capillary action is promoted, facilitating the injection of the transparent adhesive material in the resin injection step to be described later.

The relationship between the capillary action and the gap will be described in a little more detail. It is known that the height of rise, h, of liquid in a tube due to capillary action is given by the following formula (1).

$$h = 2T \cos \theta / \rho g r \qquad (1)$$

where T is the surface tension, $\theta$ is the contact angle, $\rho$ is the density of the liquid, g is the acceleration due to gravity, and r is the inner radius of the tube, That is, the smaller the inner radius r of the tube, the larger the height of rise, h, of liquid in the tube due to the capillary action, and thus the better the capillary action works. The inner radius of the tube here corresponds to the gap in the blank lens 300". Accordingly, as the gap becomes narrower, the capillary action works better, which means that the resin can also be injected sufficiently into the inner portion farther away from the resin injection port. Furthermore, since the gap g1 is made smaller than the gap g2, when the transparent adhesive resin is injected through the gap g2, the capillary force acts in the direction of the gap g1, and thus the space is filled from the inside toward the outside with the filling material, forcing air bubbles and vacuum voids outside; in this way, the space can be filled thoroughly without trapping air bubbles or vacuum voids.

While the first transparent substrate 310 has been formed in a convex shape sloping down toward the substrate edges, the second transparent substrate 320 may also be formed in the same shape. That is, at least one of the substrates need be formed in the above shape.

The manufacturing process described earlier can be employed to fabricate the blank lens shown in FIG. 13. That is, the structure fabricated by bonding together the first and second transparent substrates 310 and 320 is placed in a vacuum atmosphere, and a transparent resin is filled by capillary action into the space between the first sealing material 340 and the second sealing material 360 to form the filling layer 350. The fabrication of the blank lens (the outer shape of the lens is not formed yet) is thus completed. In an alternative process, before bonding together the first and second transparent substrates 310 and 320, the photo curable resin and the transparent adhesive material may be deposited on the first transparent substrate 310 in a vacuum atmosphere, as in the earlier described process, and thereafter, the first and second transparent substrates 310 and 320 may be bonded together. In this case, the transparent adhesive material is also dripped in a suitable amount from a dispenser (not shown) onto the first transparent substrate 310. Even when the transparent adhesive material is thus deposited before bonding together the first and second transparent substrates 310 and 320, since the substrate gap at the position where the sealing material is to be formed is made smaller than the gap at the substrate edges, the transparent adhesive material can be filled sufficiently into the portion near the sealing material, eliminating the possibility of trapping air bubbles (vacuum voids), etc. However, when depositing the transparent adhesive material, it is preferable to deposit the material starting from the portion near the center position where the sealing material is to be formed. After that, the photo-curable resin and the transparent adhesive material, both sandwiched between the first and second transparent substrates 310 and 320, are simultaneously irradiated with UV rays to form the sealing material 340 and the filling layer 350, respectively, as illustrated in the earlier given drawing.

Before filling the transparent adhesive material, for forming the filling layer 350, if the regions on the first, and second transparent substrates 310 and 320, between which the transparent adhesive material is to be filled, are pretreated by plasma, it becomes possible to improve the wettability of the transparent adhesive material. Further, if the surfaces of the regions on the first and second transparent substrates 310 and 320, between which the transparent adhesive material is to be filled, are cleaned after dripping the liquid crystal material (see S16), it also becomes possible to improve the wettability of the transparent adhesive material.

Furthermore, if the base surfaces of the regions on the first and second transparent substrates 310 and 320, between which the transparent adhesive material is to be filled, are roughened to increase the contact area, the adhesion can be enhanced. In the above-described example, the transparent adhesive material has been described as adhering to the alignment films, but if the adhesion to ITO, etc., is strong enough, the alignment films need not necessarily be formed in the region where the filling layer 350 is formed.

The edged lenses 100 to 300 have each been described above by dealing with the configuration in which the Fresnel lens structure is constructed only on the first transparent substrate and no Fresnel lens structure on the second transparent substrate, but the configuration is not limited to this specific example; rather, the Fresnel lens structure may be formed on each of the first and second transparent substrates. Further, the method of forming the Fresnel lens structure on the transparent substrate is not limited to the imprint method that forms the structure by depositing a resin within the substrate, but the Fresnel lens structure may be formed by directly processing the transparent substrate. While the edged lens 302 has been described as using curved substrates, it is also possible to use substrates not curved; in that case also, since the outside sealing material containing large-diameter outside spacers is provided, the gap at the substrate edges is held larger than the gap at the inside sealing material, and the same effect as described above can be obtained.

The various edged lenses 100 to 300 (the blank lenses 100" to 300") have been described separately from each other, but the various configurations may be combined in a suitable way. For example, the substrate thickness at the periphery may be made smaller than the substrate thickness at the position where the sealing material is formed, and at the same time, one of the substrate may be formed in a shape more curved than the other, or an outside sealing material containing outside spacers may be provided. In any of the above edged lenses, since the thickness of the liquid crystal layer formed in the region enclosed by the sealing material, more specifically, the thickness of the liquid crystal layer at least in the effective region, is maintained constant after the substrates are bonded together, there arises no problem in the quality of performance in the effective region.

While the edged lenses 100 to 103 and 300 have been described above as liquid crystal optical elements by taking as examples the lenses for electronic eyeglasses, it will be appreciated that the edged lenses can be used as optical lenses for any other application such as electron microscopes, digital cameras, and pickup lenses, as long as the liquid crystal lens is of a structure such that, after injecting a liquid crystal material, the liquid crystal material is sealed into a portion (center portion) of the lens and its outer shape is cut to the final, desired shape. Further, the liquid crystal lens can be constructed by using a Fresnel lens as its optical structure, but since the feature of the edged lens does not lie in the optical structure itself, the present invention is not limited to this particular structure but can be applied to any other liquid crystal optical element that has an optical structure such as a cylindrical lens, a prism, a microlens array, or the like. Further, neither of the substrates need necessarily be provided with an optical structure such as a Fresnel lens structure. For example, the present invention can also be applied to an optical element that has a function for controlling light by applying a voltage across the electrodes formed between the substrates.

What is claimed is:

1. An edged lens manufacturing method comprising the steps of:
    disposing, between a first transparent substrate and a second transparent substrate, a first sealing material which does not contain any spacer member and a second sealing material which contains a spacer member, said second sealing material being located outwardly of said first sealing material, and thereby forming a blank lens having a liquid crystal layer provided between said first transparent substrate and said second transparent substrate and sealed by said first sealing material;
    forming a finished lens by processing said blank lens; and
    forming an edged lens by removing portions containing said second sealing material.

2. The edged lens manufacturing method according to claim 1, further comprising the step of forming a filling layer between said first sealing material and said second sealing material.

3. The edged lens manufacturing method according to claim 1, further comprising a third sealing material which contains a spacer member, and which is disposed in a region provided between said first transparent substrate and said second transparent substrate and located between said first sealing material and said second sealing material.

4. The edged lens manufacturing method according to claim 3, wherein said third sealing material is colored.

5. The edged lens manufacturing method according to claim 3, wherein edging is performed so that said third sealing material will remain in a beveled edge of said edged lens.

6. The edged lens manufacturing method according to claim 1, further comprising the step of stacking said first transparent substrate and said second transparent substrate one on top of the other so that said first transparent substrate and said second transparent substrate are separated from each other by a gap that is larger at substrate edges than at a position where said sealing material is disposed.

\* \* \* \* \*